United States Patent [19]

Brown

[11] 4,232,515

[45] Nov. 11, 1980

[54] SUPERSONIC CRUISE AIRPLANE AND ENGINE

[75] Inventor: Robert B. Brown, Kent, Wash.

[73] Assignee: The Boeing Company, Seattle, Wash.

[21] Appl. No.: 883,596

[22] Filed: Mar. 6, 1978

[51] Int. Cl.² .............................................. F02K 3/00
[52] U.S. Cl. .................................... 60/204; 60/243; 244/46
[58] Field of Search ................. 60/204, 243, 233, 240; 244/45 A, 46

[56] References Cited

U.S. PATENT DOCUMENTS

| | | | |
|---|---|---|---|
| 2,840,322 | 6/1958 | Griffith | 60/39.28 |
| 2,846,846 | 8/1958 | Mock | 60/39.28 |
| 2,850,871 | 9/1958 | Drake | 60/243 |
| 2,971,328 | 2/1961 | McLafferty | 60/233 |
| 2,982,496 | 5/1961 | Creasey et al. | 244/45 A |
| 3,008,515 | 11/1961 | Wente | 60/39.28 |
| 3,067,577 | 12/1962 | Dew | 60/243 |
| 3,076,312 | 2/1963 | Halgh | 60/39.28 |
| 3,129,563 | 4/1964 | Long | 60/39.28 R |
| 3,139,727 | 7/1964 | Torell | 60/39.28 |
| 3,158,996 | 12/1964 | Herbert et al. | 60/39.28 |
| 3,164,202 | 1/1965 | Johnson | 60/243 |
| 3,181,817 | 5/1965 | Marcus et al. | 60/233 |
| 3,188,022 | 6/1965 | Ornberg | 244/45 A |
| 3,680,816 | 8/1972 | Mello | 244/46 |
| 3,813,063 | 5/1974 | Martin | 60/39.28 R |
| 3,854,287 | 12/1974 | Rembold | 60/243 |
| 3,866,416 | 2/1975 | Lewis | 60/243 |

*Primary Examiner*—Robert E. Garrett
*Attorney, Agent, or Firm*—Christensen, O'Connor, Johnson & Kindness

[57] ABSTRACT

A supersonic airplane has a fuselage, a wing, a vertical stabilizer, a canard and a pair of turbine engines mounted in the fuselage. Each engine is of relatively simple design with a fixed inlet, a compressor and a turbine with a single drive shaft interconnecting the turbine and compressor. The engine can employ either fixed or variable exhaust nozzle geometry, depending on whether an afterburner is installed. The engine is point designed to provide maximum design thrust at a given intermediate throttle setting when the airplane is being propelled by the engine at a predetermined supersonic cruise Mach number. Maximum allowable thrust at speeds below the predetermined cruise Mach number is achieved without variable geometry air inlets by maintaining the corrected airflow through the engine at a substantially constant value equivalent to the corrected airflow at the predetermined supersonic cruise Mach number. The engine corrected airflow is maintained at a constant value by monitoring an engine operating parameter indicative of corrected airflow and adjusting the fuel flow to the engine to reduce the actual speed of the compressor and turbine.

26 Claims, 11 Drawing Figures

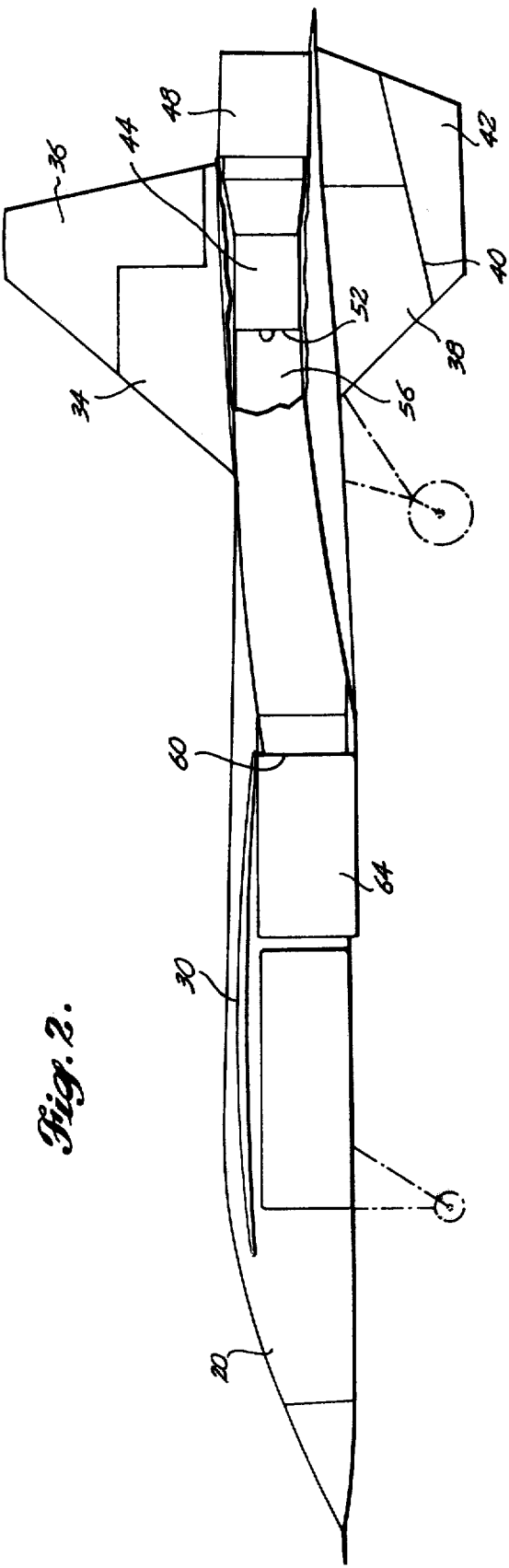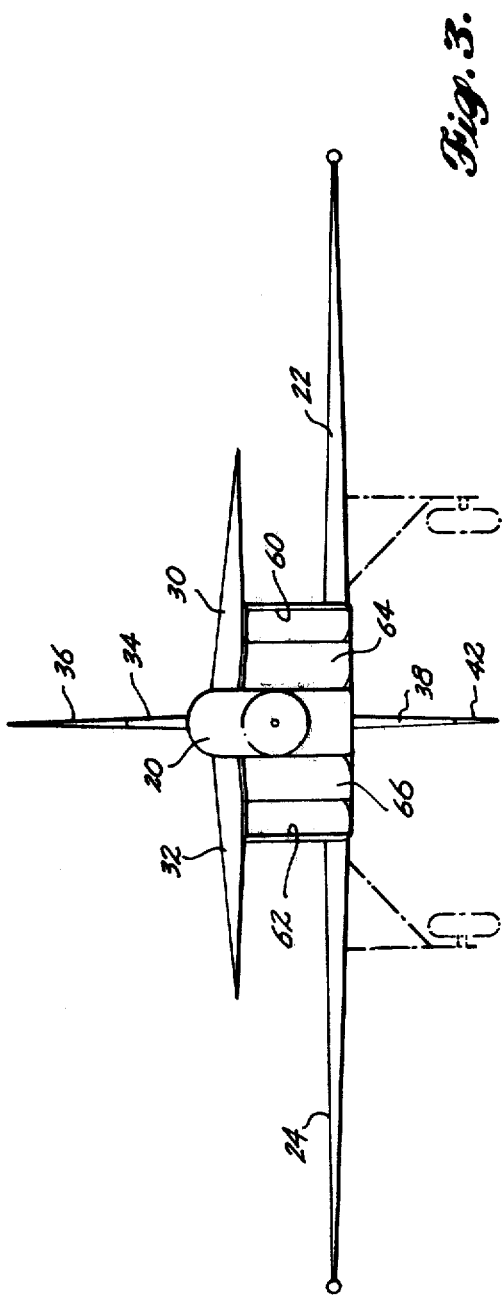

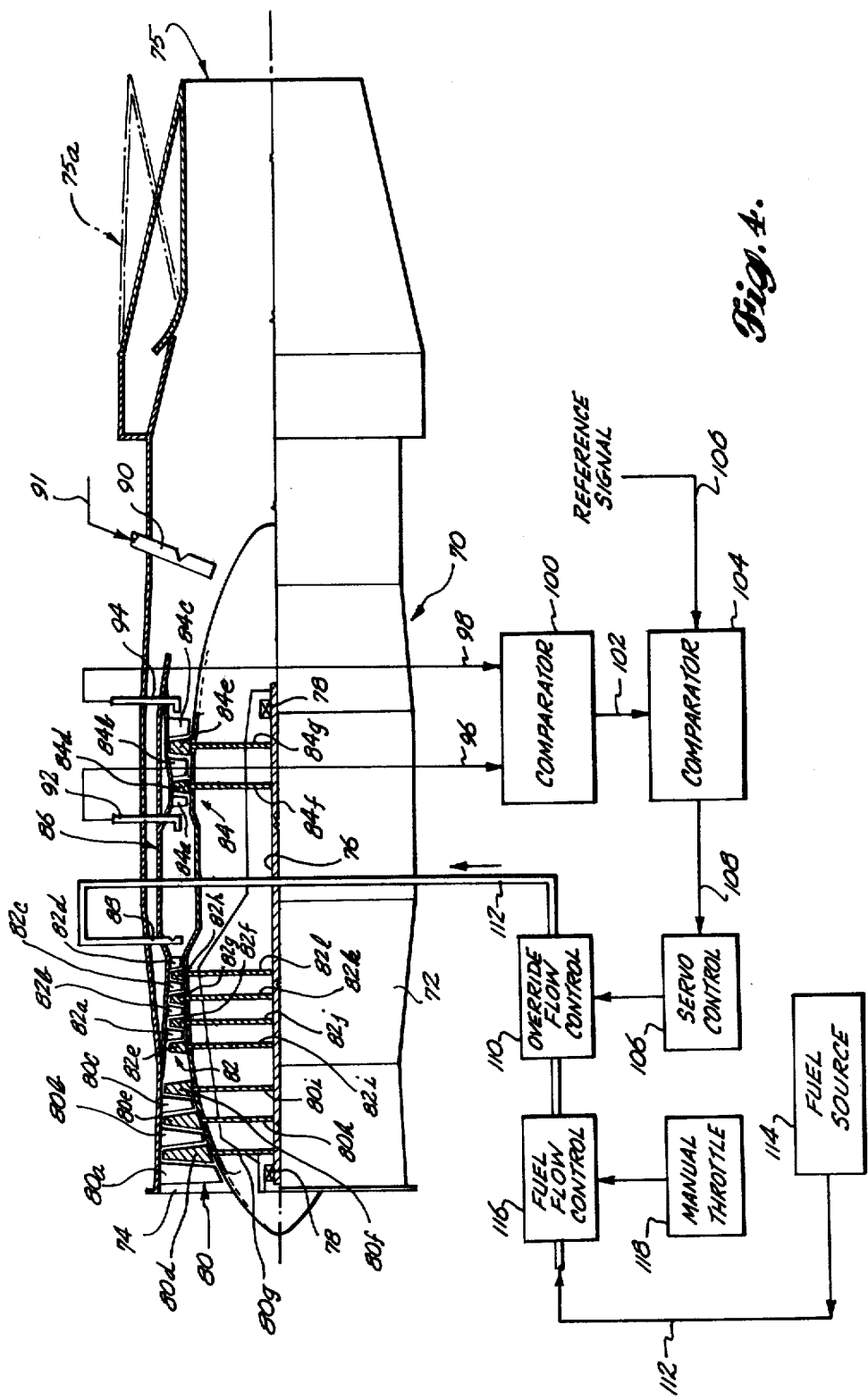

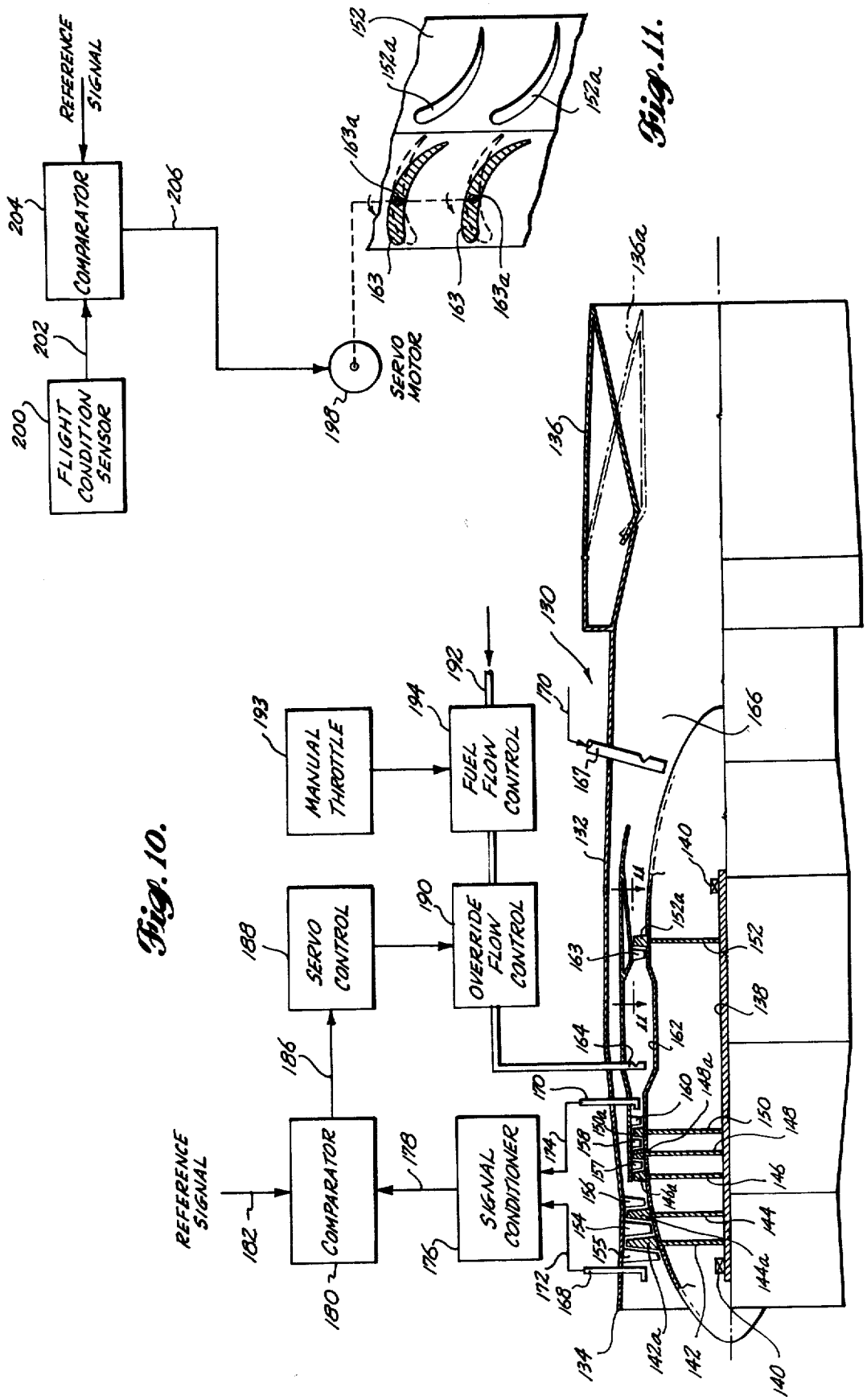

SUPERSONIC CRUISE AIRPLANE AND ENGINE

BACKGROUND OF THE INVENTION

The present invention relates to supersonic airplanes and turbine engines for such airplanes, and more particularly to a single spool turbine engine designed to provide a predetermined amount of thrust at a given throttle setting when propelling an airplane at a predetermined supersonic Mach number, to a method for operating such an engine, and to an airplane designed for such an engine.

A conventional turbojet engine is designed to provide maximum thrust at sea level under static operating conditions, that is, such engines have a sea level static (SLS) design point. The maximum thrust that can be derived from a conventional turbojet engine at an intermediate throttle setting (a predetermined high throttle setting without afterburning) is limited by the turbine inlet temperature, other internal engine operating parameters, and limitations imposed by engine construction materials and techniques. The corrected airflow through the conventional turbojet engine with a sea level static design point is maintained at the maximum allowable value from static conditions through transonic flight speeds. Increases in the flight Mach number beyond transonic flight speeds will cause the engine corrected airflow to lapse, that is, drop significantly at an almost exponential rate, as the flight Mach numbers increase linearly above the transonic flight regime. The lapse in corrected airflow through the conventional turbojet engine begins when the turbine inlet temperature rises to its maximum allowable level. Thereafter, increasing compressor inlet temperatures associated with the increased flight Mach number requires a reduction in fuel flow to the engine, causing the compressor corrected rotor speed and corrected airflow to decrease while the turbine inlet temperature remains constant at its maximum allowable value.

The significant decrease in corrected airflow through a conventional sea level static (SLS) design engine at supersonic Mach numbers will cause a corresponding drop in the net thrust derivable from the engine at supersonic Mach numbers. In order to obtain the required amount of thrust from a conventional turbojet engine operating at supersonic Mach numbers, the engine must be overdesigned to provide adequate thrust at supersonic Mach numbers, yielding an engine that is grossly overdesigned for the subsonic and transonic flight regimes. Such an overdesigned conventional engine is characteristically large and heavy, both of which characteristics are undesirable. An alternative to overdesigning the engine is to provide the engine with an afterburner, thus providing an augmented power setting to achieve the thrust required for driving an airplane at supersonic Mach numbers. An augmented power setting, however, significantly increases the specific fuel consumption of the engine (pounds of thrust per pound of fuel per hour consumed, hereinafter referred to as SFC). To achieve fuel efficient supersonic flight speeds, however, it is desirable to operate an engine at an intermediate power settings (that is, a nonaugmented power setting) rather than a partially or fully augmented power setting, thereby lowering the SFC at supersonic speeds.

It is a broad object of the present invention to provide a turbojet engine that can provide adequate thrust and associated low specific fuel consumption at supersonic flight speeds. Additional objects of the present invention are to provide such an engine that is simple in design and relatively inexpensive and that has high reliability and low maintenance; to provide such an engine that will yield the desired thrust at intermediate (nonaugmented) throttle settings at supersonic flight speeds; to provide such an engine that has adequate nonaugmented transonic thrust to provide acceptable acceleration through the transonic flight regime so that the supersonic flight speeds can be achieved in a reasonable time interval; to provide such an engine that can be manufactured with current state of the art engine technology and materials; and, to provide such an engine that generally has the same size and weight as the conventional SLS designed afterburning turbojet engines.

Another broad object of the present invention is to provide an airplane and associated inlet and exhaust nozzle configurations that are relatively simple, that require no variable geometry engine inlet structure or variable geometry nozzle structure for intermediate throttle settings and that enhance the operating characteristics of the turbine engine employed to drive the airplane; and to provide an airplane that can economically cruise at supersonic flight speeds and that has the capability to reach such speeds in a reasonable time.

SUMMARY OF THE INVENTION

In accordance with the foregoing objects, and other objects that will become apparent to one of ordinary skill in the art upon reading the following specification, the present invention provides an improved turbojet engine that is point designed to provide a predetermined amount of thrust at a given throttle setting when propelling an airplane at a predetermined supersonic flight Mach number. The improvement includes a control means for maintaining the corrected airflow through said engine at a substantially constant value at flight Mach numbers below the predetermined supersonic flight Mach number. Preferably, the turbine engine of the present invention is of the single spool type, including a compressor, a turbine and a single drive shaft interconnecting the turbine and compressor. More preferably, the turbine engine has associated with it a fixed geometry inlet for ducting air to the compressor. The engine is preferably point designed to economically operate at an intermediate throttle setting at supersonic flight Mach numbers in the range of from 2.0 to about 2.7. An afterburner and variable geometry exhaust nozzle can be employed with the turbine engine of the present invention to provide augmented transonic thrust to shorten the acceleration time of the airplane through the transonic flight regime.

An additional aspect of the present invention includes a method for controlling the turbine engine described above by sensing an engine operating parameter such as the turbine or compressor pressure ratio to provide a signal representative of the corrected airflow through the engine. This signal is then compared with a second signal representative of a predetermined maximum value of the engine operating parameter. A control signal, derived from and representative of the difference between the first and second signals, is then employed to adjust the operating condition of the engine to maintain the corrected airflow through the engine constant at flight Mach numbers below the predetermined supersonic flight Mach number. For engines of the present invention that are point designed to operate at supersonic fight Mach numbers on the order of 2.7, the angle of the turbine rotor blades of the engine can be increased relative to the stator blades at flight Mach numbers below the predetermined supersonic flight Mach number.

In a further aspect of the present invention, an airplane having a wing, a vertical stabilizer, a canard and a turbine engine mounted in the fuselage is provided. The turbine engine for the airplane is point designed to provide maximum thrust at a given intermediate throttle setting when the airplane is being propelled by the engine at a predetermined supersonic flight Mach number. The engine includes control means for maintaining the corrected airflow through the engine at a substantially constant value at flight Mach numbers below the predetermined supersonic flight Mach number. The airplane has an engine air inlet positioned adjacent the rearward portion of the canard for ducting air to the turbine engine and a nozzle located in the aft portion of the fuselage for directing exhaust gasses rearwardly from the engine. Preferably, the canard is located on the fuselage above and forwardly from the air inlet and is so positioned relative to the inlet to provide precompression of the air flowing under the canard and into the air inlet while the airplane is in flight. If maximum acceleration is desired, the airplane and engine can also employ an afterburner and a variable geometry exhaust nozzle to increase the available thrust in the transonic flight regime.

BRIEF DESCRIPTION OF THE DRAWINGS

A better understanding of the present invention can be derived by reading the ensuing specification in conjunction with the accompanying drawings, wherein:

FIG. 2 is an elevation view of the airplane of FIG. 1;

FIG. 3 is a front view of the airplane of FIG. 1;

FIG. 4 is a simplified view in partial longitudinal section of an engine designed in accordance with the present invention shown with an accompanying block diagram illustrating engine operating parameter sensors, comparators, and fuel flow regulation apparatus for maintaining corrected airflow through the engine at a constant value for all flight Mach numbers;

FIG. 10 is a simplified view in partial longitudinal section of another embodiment of the point design turbojet engine of the present invention having variable angle turbine blades and including a schematic block diagram of engine parameter sensors, comparators and fuel flow regulation apparatus for maintaining corrected airflow through the engine at a constant value for all flight Mach numbers; and FIG. 11 is a simplified sectional view taken along section line 11—11 of FIG. 10 showing the variable position turbine blades in conjunction with a block diagram illustrating a flight condition sensor, a comparator, and apparatus for varying the position of the turbine blades in response to a control signal from the comparator.

DETAILED DESCRIPTION

Figure 1:
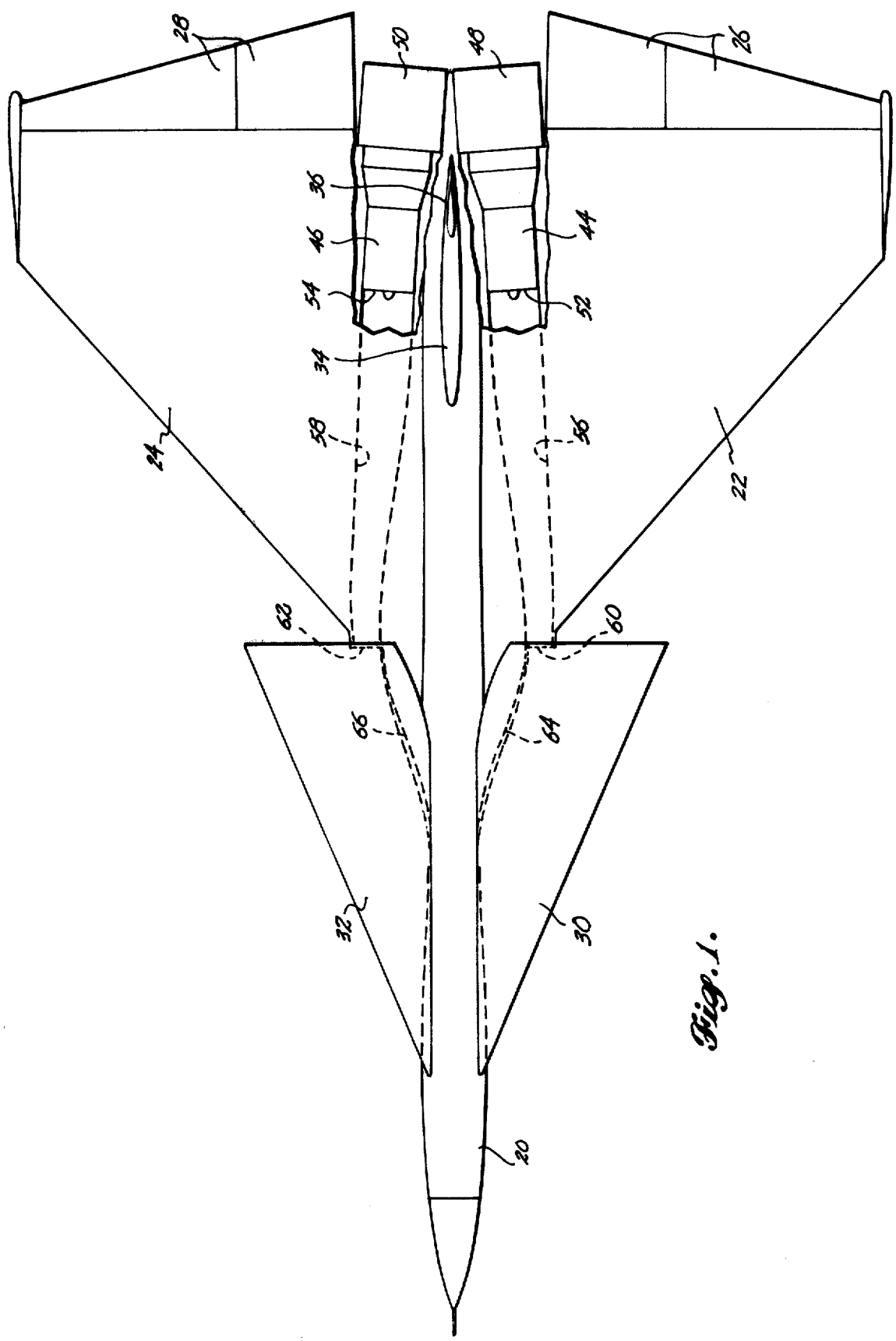
FIG. 1 is a plan view of an airplane configured in accordance with the present invention in which the point design turbojet engine of the present invention is employed.

Certain terms used herein are of a specialized nature but are known to those of ordinary skill in engine and airplane technology. However, to facilitate a ready and complete understanding of the invention, definitions for certain of these terms are set forth below.

The term "turbojet engine" is intended to encompass all jet engines employing a compressor, a combustor and a turbine for generating a high energy exhaust stream that is directed away from the engine to yield a reactive thrust component on the engine and consequently on an airplane in which the engine is mounted.

The phrase "intermediate throttle setting" is utilized to described a throttle setting for a turbojet engine which causes the engine to generate a predetermined amount of thrust at or near the upper limit of the engine's design capability without the use of afterburning apparatus. The term "intermediate thrust" is used to describe the thrust derived from a turbojet engine at an intermediate throttle setting. The term "augmented throttle setting" is utilized to describe a throttle setting for a turbojet engine having afterburning apparatus which causes the engine to generate the thrust available from the engine at an intermediate throttle setting plus the thrust available through the operation of the afterburning apparatus. The term "augmented thrust" is used to describe the thrust available at an augmented throttle setting.

The term "single spool" is utilized to define that portion of the turbojet engine consisting of a compressor, a turbine and a single drive shaft interconnecting the turbine with the compressor. A single spool engine may have one or more stages in each of the compressor and the turbine.

The term "engine Mach number" refers to the Mach number of the air flowing through or past any given point in the engine downstream of the compressor.

The term "flight Mach number" refers to the flight speed in Mach number of a jet propelled airplane.

The term "inlet Mach number" is utilized to refer to the Mach number of the air flowing past the face of the inlet duct to the compressor.

The term "engine corrected airflow" or "corrected airflow" refers to the temperature and pressure corrected mass flow rate of air through the engine. Engine corrected airflow is defined as $$\frac{W_a \sqrt{\theta_2}}{\delta_2}$$

wherein $W_a$ is the actual mass flow rate of air in pounds per second at the inlet face of the engine, $\theta_2$ is the total temperature at the face of the engine in degrees Rankine divided by 519.4° Rankine, and $\delta_2$ is the total pressure at the face of the engine in pounds per square foot divided by 2116 pounds per square foot.

The term "inlet geometry" refers to the structural configuration of the inlet duct leading to the compressor of a turbine engine. The phrase "variable inlet geometry" refers to structure associated with the inlet duct that is movable to vary the cross sectional configuration of the inlet duct. In contrast "fixed inlet geometry" refers to inlet structure that is configured in a premanent or fixed relationship and contains no movable structure to vary the cross sectional geometry of the inlet duct. As a corollary, "fixed nozzle geometry" refers to an exhaust nozzle structure having a fixed configuration, while "variable nozzle geometry" refers to exhaust nozzles having movable walls to vary the cross sectional configuration of the nozzle during use.

Referring to FIGS. 1, 2 and 3, one airplane with which the novel engine of the present invention can be employed generally has an elongated fuselage 20 and a delta wing configuration including a left wing 22 and a right wing 24. Segmented elevons 26 and 28 are mounted on the aft portion of the left and right wings 22 and 24, respectively, and integrate the functions of conventional elevators and flaps. The elevons are provided in four segments, two segments on each wing, to permit safe flight if any one of the elevon segments should fail. Left and right canard segments 30 and 32 respectively are mounted on the upper, forward half of the fuselage and terminate in trailing edges adjacent the root and above the leading edge of the delta wings 22 and 24. In the embodiment shown, the canard has no aerodynamic control surfaces, but can employ such surfaces if desired. The canard has an aerodynamically curved, positive camber upper surface and a substantially flat bottom with a slight under camber. The canard has a slight positive angle of incidence relative to the delta wings. The preferred angle of incidence is a positive 2°. The preferred angle of incidence for the canard permits the wing trailing edge controls to always be in a zero trim condition or slightly down when the wing is at a cruise angle of attack. The canard also functions to move the aerodynamic center of the airplane forwardly of that which would result if no canard were used, resulting in a long tail arm to the trailing edge wing controls. The long tail arm allows the pilot to maneuver the airplane, especially in the pitch moment, with smaller movements in the elevons.

A dorsal tail surface 34 having an aerodynamic cross section is mounted on the aft portion of the fuselage and includes a rudder 36 for yaw control. A ventral tail surface 38 is also mounted on the aft portion of the fuselage to provide additional directional stability for high maneuverability at supersonic Mach numbers. The ventral tail surface 38 can be hinged along a hinge line 40 so that the lowermost segment 42 of the ventral tail surface can be swung upwardly to provide adequate ground clearance upon takeoff and landing.

Two engines 44 and 46 are mounted in the aft portion of the fuselage. The engines 44 and 46 will be described in substantially more detail later in the specification. However, it is to be understood that the engines are point designed for maximum thrust at an intermediate throttle setting at flight Mach numbers of between 2.0 and 2.7. For the airplane shown, it is preferred that the engines be point designed for maximum thrust at an intermediate throttle setting for flight Mach numbers on the order of 2.7. The engines terminate in exhaust nozzles 48 and 50, to be described in more detail below, which direct the high energy exhaust rearwardly from the fuselage 20 of the airplane. The engines and the nozzles are oriented so that the exhaust stream emanating from the nozzles is directed at a small angle inwardly toward the longitudinal center line of the airplane. This orientation of the exhaust stream reduces the overall drag characteristics of the airplane and thus increases the airplane efficiency. Combustion air is fed to the inlet faces 52 and 54 of the engines 44 and 46, respectively, through inlet ducts 56 and 58, respectively. The inlet ducts 56 and 58 open forwardly in rectangular openings 60 and 62, the planes of which are oriented substantially orthogonally to the longitudinal center line of the fuselage 20. The inlets ducts 56 and 58 extend rearwardly from the rectangular openings 60 and 62 and transition from a rectangular cross section at the forward end of the ducts into a circular cross section at the rearward end of the ducts equivalent to that of the inlet faces 52 and 54 of the engines. The inlet openings 60 and 62 to the inlet ducts are spaced outwardly from the sides of the forward portion of the fuselage 20. Entrance ramps 64 and 66 extend forwardly and inwardly relative to the fuselage from the inner vertical edges of the duct inlets and fair into the fuselage below the midportion of the canard segments 30 and 32, respectively. The inlet openings 60 and 62 are positioned vertically immediately forwardly of the trailing edge of the canard segments 30 and 32 and have their upper edge positioned adjacent the trailing edge of the canard segments, leaving only a small gap between the upper edge of the inlet openings and the trailing edge of the canard surfaces. Since the vertical ramps 64 and 66 are completely in the canard flow field, the orientation and relationship of the canard segments with respect to the inlet ramps protect the inlet from all yaw and pitch cross flows during flight of the airplane. At cruise angles of attack, the canard flow field provides precompression of the air entering the inlet, lowering the inlet Mach number below that of the flight Mach number. Thus the inlet can be point designed for an inlet Mach number lower than that which would otherwise be required if the inlet geometry just described were not employed. In the preferred airplane and engine configuration illustrated in FIGS. 1 through 3, the entrance ramps 64 and 66, the inlet openings 60 and 62 and the inlet ducts 56 and 58 all have fixed geometry, providing a relatively simple inlet structure in the fuselage and eliminating the need for extra controls, variable geometry inlet surfaces and the associated weight-increasing variable geometry surface actuating apparatus.

Referring still to FIGS. 1 through 3, and especially to the latter, the extremely large capture area for the engine, including the entrance ramps 64 and 66 and the inlet openings 60 and 62, provide the airplane with a very small frontal area, which comprises only the nose portion and that portion of the fuselage rearwardly of the nose that extends vertically into the airstream. The small frontal area results in an airplane having very low drag, which in turn results in a more fuel efficient airplane because relatively smaller engines can be utilized than would otherwise be required.

Referring now to FIG. 4, one embodiment of the point designed turbojet engine of the present invention is illustrated. The engine 70 includes a housing 72, inlet face 74, and a variable geometry nozzle 75. The engine has a single spool, including a single drive shaft 76 mounted for rotation in bearings 78, that directly couples in driving relationship the first section of the compressor, generally designated 80, and the second section of the compressor, generally designated 82, with the turbine, generally designated 84. The first section 80 of the compressor consists of three sets of axially spaced, stationary guide vanes 80a, 80b and 80c each followed by the rotating compressor blades 80d, 80e and 80f coupled to the drive shaft 76 via compressor wheels 80g, 80h and 80i. Similarly, the second section 82 of the compressor comprises four sets of axially spaced stationary guide vanes 82a, 82b, 82c and 82d preceded by four sets of rotating blades 82e, 82f, 82g and 82h in turn coupled to the drive shaft 76 by axially spaced compressor wheels 82i, 82j, 82k and 82l. An annular combustor generally designated 86 is located aft of the compressor. Fuel is sprayed into the combustor 86 at a location aft of the compressor by spray bar 90. As will be understood by one of ordinary skill in the art, more than one spray bar 90 is normally employed in the engine to supply fuel to the combustor, although only one is illustrated for purposes of simplifying the explanation of the engine. The turbine 84 is situated aft of the combustor and receives the pressurized products of combustion from the combustor 86. The products of combustion are expanded through the turbine 84. The turbine 84 comprises three axially spaced sets of stator blades 84a, 84b and 84c, sandwiched between which are two sets of rotor blades 84d and 84e. The rotor blades 84d and 84e are coupled via turbine wheels 84f and 84g to the drive shaft 76. As the products of combustion from the combustor 86 are expanded through the turbine 84 in a conventional manner, the turbine rotor, consisting of the rotor blades and rotor wheels, turns the drive shaft, which in turn drives the compressor to compress combustion air entering through the inlet face 74 of the engine.

To achieve the engine corrected airflow required to provide the high intermediate thrust levels at and above the Mach 2.0 design point, the compressor blade angles must be about 20% to 40% greater than the compressor blade angles employed in conventional engines. The compressor blade angles in the conventional turbojet are on the order of 22° (relative to a plane orthogonal to the centerline of the engine), while the required compressor blade angles for the point design engine must be on the order of 26°, or greater if desired. The higher blade angle will provide the required axial flow of combustion air to the combustor at cruise conditions.

Optionally, the engine can include conventionally designed afterburning apparatus, simply shown in FIG. 4 as a spray bar 90 located in the throat of the nozzle aft of the turbine 84. As will be understood by one of ordinary skill in the art, a plurality of spray bars similar to 90 are normally employed to provide adequate fuel and even combustion in the afterburner. Fuel is supplied to the afterburner spray bar 90 via line 91 from a fuel source (not shown). The fuel supply through line 91 is regulated by conventional valving apparatus responsive to pilot controlled throttles in a conventional manner. If the optional afterburner apparatus is employed, it is preferred to also employ the variable geometry nozzle 75 that adjusts the nozzle throat area between a first, restricted position for intermediate throttle settings (as shown in solid outline) and a second open position for augmented throttle settings. When the afterburning apparatus is in operation, the throat area of the nozzle is enlarged to increase the exit area of the nozzle by moving the variable nozzle structure outwardly to the position shown in dot-dash outline 75a. The exit area of the nozzle is increased to relieve back pressure on the turbine at augmented throttle settings and to appropriately match the flow rate and pressure in the nozzle with the corresponding speed and temperature of the turbine at both intermediate and augmented throttle settings. The control and actuation apparatus for the variable geometry nozzle structure are not shown or described as any of a variety of conventional variable geometry nozzles can be employed with the engine 70.

The engine illustrated in FIG. 4 is point designed at the cruise condition to provide the desired high intermediate thrust levels at supersonic Mach numbers on the order of 2.0. The engine is point designed for maximum efficiency and thrust at flight Mach numbers of Mach 2.0 without compromise to off design operating conditions, that is, without compromise to performance at flight Mach numbers below 2.0. Point designing the engine for maximum thrust at Mach 2.0 requires the engine configuration, including the inlet face size, compressor construction, combustor construction, turbine construction and nozzle construction, to be optimized so that the engine maximum turbine inlet temperature, compressor ratio, corrected airflow, corrected rotor speed and physical rotor speed are all designed to achieve a maximum at the Mach 2.0 cruise condition. The engine off design physical speed is controlled as a function of compressor face total temperature so as to always operate at a constant compressor match point at intermediate power settings for all flight speeds. That is, the off design physical speed of the rotor is varied so that the engine Mach number and the engine corrected airflow is maintained constant for all flight speeds below the point design conditions of Mach 2.0. Point designing the engine for maximum thrust at an intermediate throttle setting for flight speeds of Mach 2.0 allows fixed geometry inlet structure to be utilized and provides a near optimum match of the fixed geometry inlet structure to engine airflow demand at the supersonic flight speed design point. To achieve the near optimum match of the engine airflow demand to the inlet structure of a conventional SLS turbojet engine would require the use of variable geometry inlet structure. The high corrected airflow that can be employed at the point design cruise conditions with the engine of the present invention allows utilization of a larger nozzle exit area relative to the conventional SLS engine, which reduces the aft body drag over that experienced with conventional SLS engines at high Mach numbers. The engine of the present invention can achieve installed intermediate thrust increases at cruise conditions on the order of 50% over equally sized, fixed geometry inlet, conventional SLS turbojet engines at Mach flight numbers of 2.0.

The point design engine of the present invention, however, when designed to provide adequate thrust for a given airplane configuration at the point design conditions (for the engine illustrated in FIG. 4, flight Mach numbers of on the order of 2.0) will suffer an intermediate throttle setting thrust lapse with decreasing flight Mach numbers because the turbine temperature, i.e., the total temperature at the face of the turbine, must be reduced at flight mach numbers below the supersonic cruise condition to avoid exceeding the upper limit of the compressor corrected rotor speed. If the total temperature (or the engine corrected airflow) were allowed to exceed the predetermined maximum, the physical speed of the rotor would exceed the structural limitations of the rotor and could cause physical damage to or disintegration of the engine. The transonic intermediate thrust lapse may, under certain conditions, be too severe to provide adequate airplane transonic acceleration. That is, under transonic flight conditions, the engine of the present invention may provide inadequate thrust to accelerate the airplane in which it is installed through the transonic flight regime in a time interval acceptable to the user of the airplane. For this reason, it is desirable and preferred to install afterburning apparatus to augment the net thrust derivable from the engine in the transonic flight regime. Thus, an augmented throttle setting can be utilized with the point design engine of the present invention to offer thrust levers for acceleration through the transonic flight regime comparable to those derived from conventional SLS turbojet engines of equivalent size and weight, while retaining the high intermediate thrust levels and economy of the point design engine for the supersonic or point design supersonic speeds.

The engine corrected airflow is maintained at a constant level for all flight Mach numbers below the point design Mach number by varying the fuel input to the engine to decrease the physical rotor speed at flight Mach numbers below the point design Mach number. In the embodiment of the invention illustrated in FIG. 4, an engine operating parameter that can be corollated to and is representative of the engine corrected airflow is sensed. The sensed engine operating parameter is compared with a reference signal indicative of the maximum and desired engine corrected airflow at an intermediate throttle setting to provide a control signal signal that in turn is representative of the difference between the reference signal and the sensed engine operating parameter. If the difference in the sensed and reference signals indicates that the engine corrected airflow is rising above the maximum point design corrected airflow, the control signal is utilized to adjust the physical rotor speed downwardly to maintain the engine corrected airflow at a constant value corresponding to that indicated by the reference signal. For example, if the engine is operating at an intermediate throttle setting at a flight Mach number of 2.0 and the airplane is slowed down to a flight Mach number below 2.0, the output signal derived from the sensed engine operating parameter and the reference signal will indicate that the engine corrected airflow is beginning to exceed or is exceeding the desired maximum, requiring a reduction in the physical rotor speed. The control signal is then utilized to reduce the fuel flow to the combustor of the engine and thereby reduce the turbine inlet temperature and the physical rotor speed. Once the physical rotor speed is reduced sufficiently, the sensed operating parameter will match with the reference sign indicating that the engine corrected airflow is back to its predetermined maximum for the given flight Mach number.

By way of another example, when the engine is accelerating the airplane through the transonic flight regime at an intermediate throttle setting that would normally provide maximum thrust at the point design conditions, the engine corrected airflow will tend to fall below the maximum engine corrected airflow at the design point. Under these conditions, the sensed operating parameter would provide an indication that the engine corrected airflow is tending to fall below or is below the predetermined maximum. Thus, the sensed engine parameter, when compared with the reference signal, will provide an output signal which in turn can be utilized to increase the fuel input to the engine and maintain the physical rotor speed at a constant value. Still referring to FIG. 4, one engine operating parameter that can be sensed to provide an indication of the engine corrected airflow through the engine is the turbine pressure ratio, that is, the ratio of the pressure at the turbine inlet to the pressure at the turbine outlet. The turbine pressure ratio can be sensed by positioning a pressure sensor 92 at the turbine inlet face to sense the pressure at the turbine face. A second pressure sensor 94 can be positioned immediately aft of the turbine to sense the pressure at the rear of the turbine. The pressure related signals provided by the pressure sensors 92 and 94 are transmitted via lines 96 and 98 to a comparator 100. The comparator 100 conditions the inlet and outlet pressure signals provided by lines 96 and 98 to provide an output signal that is representative of the actual engine corrected airflow through the engine based upon the turbine pressure ratio.

The output signal representative of the actual corrected airflow through the engine is transmitted through line 102 to a second comparator 104. The reference signal, which is indicative of the maximum point engine corrected airflow, is input to the comparator 104 via line 105 or may be embodied in a memory in the comparator 104. The actual engine corrected airflow is then compared with the maximum engine corrected airflow reference signal in comparator 104 to provide a control signal representing the difference between the actual and reference engine corrected airflow signals. The control signal can be utilized to control apparatus for adjusting the turbine inlet temperature to prevent the actual engine corrected airflow from exceeding the maximum point design (or reference) engine corrected airflow. For example, if the actual engine corrected airflow should begin to exceed the reference engine corrected airflow, the differential output signal from the comparator 104 is transmitted to a servocontrol 106 via line 108 to energize the servocontrol. The servocontrol 106 in turn is coupled to a proportional fuel flow control valve 110 interposed in the fuel supply line 112 to the spray bar 90 in the combustor 86 of the engine. The fuel control valve is positioned in the fuel line 112 so as to override the manual throttle setting to the primary fuel flow control valve 116. Thus if the control signal in line 108 indicates that the engine corrected airflow is beginning to exceed the reference engine corrected airflow, the control signal will energize the servocontrol 106 to partially close the flow control valve 110, thus reducing the quantity of fuel being introduced into the combustor 86. As a consequence, the turbine inlet temperature will be lowered, the actual rotor speed will be reduced and the turbine pressure ratio will drop. As this occurs, the pressure sensors 92 and 94 will sense the reduction in turbine pressure ratio, transmit it to comparator 100, from which the signal representative of the reduced actual engine corrected airflow will be transmitted to the second comparator 104. When the actual engine corrected airflow drops sufficiently to match the reference engine corrected airflow, the control signal from the comparator will de-energize the servocontrol 106 and thus the override flow control valve 110 at a position that will maintain the fuel flow to the combustor at the desired rate. Vice versa, as the flight Mach number of the airplane in which the engine is mounted increases, thus allowing the turbine inlet temperature to be increased, the turbine pressure ratio sensors 92 and 94 will provide a signal via the first comparator 100 indicating the actual engine corrected airflow is at a value below that of the reference engine corrected airflow. The control signal from the second comparator 104 will then energize the servocontrol 106 to open the override control valve 110 to increase the fuel flow to the engine and thus increase the turbine inlet temperature and actual engine corrected airflow up to the desired maximum value.

The control system for maintaining the engine corrected airflow constant at the maximum desired value at all flight Mach numbers below the point design Mach number is an override control system that overrides the manual throttle setting chosen by the pilot. In a conventional manner, fuel is supplied to the engine via the fuel line 112 from a fuel source 114 including a fuel storage tank, fuel pumps, and fuel metering devices. A primary fuel control valve 116 is interposed in the fuel line 112 downstream from the fuel source 114. The primary fuel control valve is controlled by a setting of the manual throttle 118. Thus, if at takeoff the pilot sets the manual throttle 118 wide open at an intermediate setting, the fuel control valve 116 will be open to its maximum extent, allowing fuel to flow to the override fuel control valve 110 for maximum intermediate thrust. However, as the engine speed increases, the turbine pressure ratio will rise and will provide a signal to the override control valve 110 to meter the fuel to the spray bar 90 in order to maintain the engine corrected airflow at the maximum allowable value as the airplane accelerates from static ground conditions to the design point flight Mach number.

The graphs of FIGS. 5 through 8 comparatively illustrate several operating characteristics of the point design engine of the present invention as contrasted with a similarly sized conventional SLS turbojet engine. For purposes of the comparison, certain design parameters are utilized to define the point design engine of the present invention and the conventional SLS turbojet engine cycles. These engine design parameters are set forth in TABLE I below:

TABLE I

| ENGINE DESIGN PARAMETERS | | |
|---|---|---|
| DESIGN PARAMETERS | CONVEN-TIONAL | POINT DESIGN |
| Design Point | SLS[1] | M = 2.0, 60,000 Ft.[2] |
| Corrected Airflow (lb/sec)[3] | 400 | 400 |
| Compressor Pressure Ratio | 10 | 10 |
| Compressor Efficiency (%) | 83 | 83 |
| Burner Exit Temp. (°F.) | 3,000 | 3,000 |
| Turbine Efficiency (%) | 87 | 87 |
| Cooling Flows | | |
| Percent Engine Airflow | 13.8 | 13.8 |
| Pressure Losses - $\Delta P/P$ | | |
| Main Burner | .06 | .06 |
| Turbine Exit | .02 | .02 |
| AB Dry[4] | .03 | .03 |
| Afterburner | | |

TABLE I-continued

| ENGINE DESIGN PARAMETERS | | |
|---|---|---|
| DESIGN PARAMETERS | CONVEN-TIONAL | POINT DESIGN |
| Temp Max (°F.) | 3340. | 3340. |
| Efficiency (%) | 89 | 89 |
| Entrance Mach No. | .26 | .26 |
| Inlet Recovery | 1. | .925 |
| Nozzle CV[5] | .985 | .985 |
| Nozzle CD[6] | 1.0 | 1.0 |

Footnotes to Table I:
[1] The conventional engine is designed to provide maximum thrust at an intermediate throttle setting at sea level static (SLS) conditions.
[2] The point design engine is designed to provide maximum thrust at a flight Mach number of 2.0 at an altitude of 60,000 feet.
[3] The engine airflow is pressure and temperature corrected to standard conditions according to the formula set forth in the first part of the Detailed Description.
[4] AB is an abbreviation for afterburner.
[5] CV is the velocity coefficient.
[6] CD is the discharge coefficient.

As can be seen from the design parameters set forth in TABLE I, the conventional engine is desinged for maximum thrust at an intermediate throttle setting at sea level static conditions while the point design engine is desinged for maximum thrust at an intermediate throttle setting at a flight Mach number of 2.0 and an altitude of 60,000 feet. The corrected air flow, the compressor pressure ratio, compressor efficiency, burner exit temperature, turbine efficiency, cooling flows, pressuse losses and afterburner design parameters are all assumed to be equal. The inlet recovery for the conventional engine is assumed to be 1 while that of the point design engine is assumed to be 0.925. Both the velocity coefficient and the nozzle coefficient are assumed to be equal for both engines.

With the foregoing design parameters, the estimated weights and dimensions for the point design engine of the present invention and for the conventional engine are substantially the same, although the diameter and length of the nozzle are slightly larger for the point design engine to reflect appropriate sizing of the augmenter duct for increased corrected airflow at a cruise flight Mach number of 2.0. Because of the slightly larger nozzle, the weight of the point design engine will be increased by a few percent. For purposes of the comparison, a fixed geometry half round inlet was selected to illustrate engine installed performance. The inlet selected has a single, fixed 25° cone with no bleed and no variable geometry. The inlet design provides minimum inlet complexity, an advantage of the point design engine, and simulates the inlet design described in conjunction with the airplane shown in FIGS. 1 through 3.

With the foregoing engine design point parameters and structural assumptions, the off design variation in the engine operating parameters at intermediate thrust setting for the point engine dictate that the point design engine be operated at a constant engine corrected airflow, engine face Mach number, compressor pressure ratio, and corrected rotor speed. (Corrected rotor speed is the actual rotor speed divided by a temperature correction factor $\sqrt{\theta_2}$, wherein $\sqrt{\theta_2}$ is equal to the total inlet temperature at the face of the engine divided by 519.4° Rankine.) The turbine temperature of the point design engine varies proportionally to the ratio of the total inlet temperature at the face of the engine divided by the maximum design temperature at the face of the engine. The rotor speed is thus variable with the total inlet temperature. For both the point design engine and the conventional engine, the nozzle throat area remains constant, that is, no variable geometry is employed at intermediate thrust settings. For the conventional engine, engine corrected airflow, engine face Mach number, compressor pressure ratio compressor efficiency and corrected rotor speed are all constant at values of $\theta_2$ below 1, and all decrease with increasing total temperatures at the face of the engine at values of $\theta_2$ above 1. The turbine temperature for the conventional engine is constant at values of $\theta_2$ above 1, and at values $\theta_2$ below 1 varied proportionally with the ratio of the total temperature at the face of the engine divided by the maximum total design temperature at the face of the engine at sea level static design conditions. Rotor speed for the conventional engine at values of $\theta_2$ above 1 is substantially constant, and at values of $\theta_2$ below 1 varies with the same ratio as does the turbine temperature.

Figure 5:
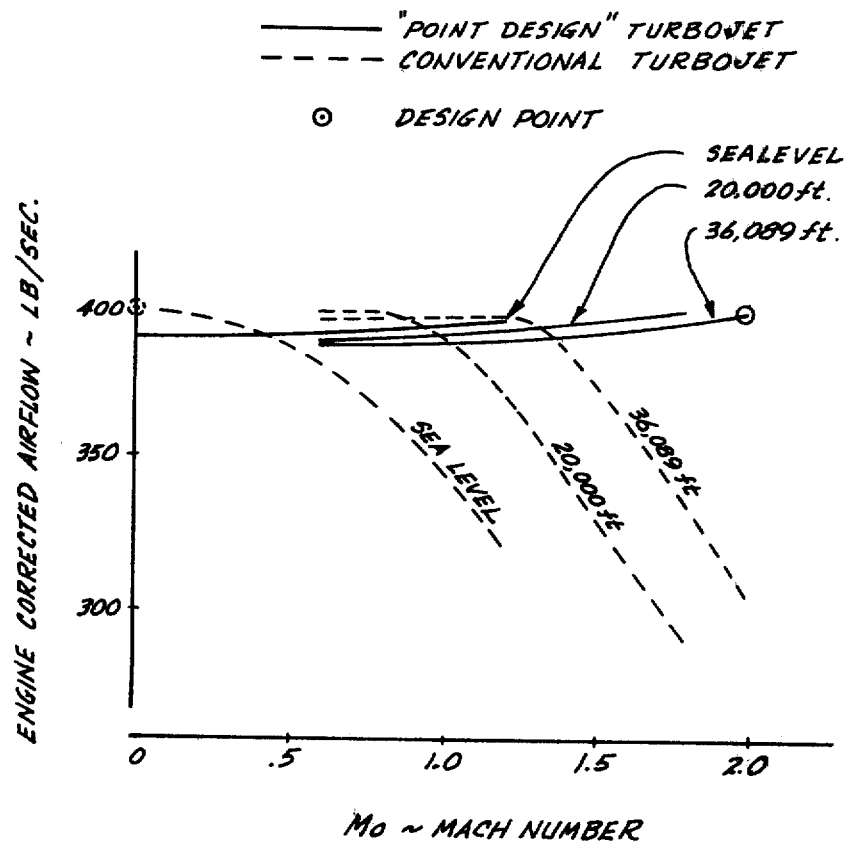
FIG. 5 is a graphic comparison of the engine corrected airflow in pounds per second at selected flight altitudes through the point design turbojet engine of the present invention and a conventional SLS turbojet engine versus flight Mach number.

FIG. 5 depicts three graphs of the engine corrected airflow of the conventional turbojet engine and the point design engine operated at an intermediate throttle setting at three different altitudes (sea level, 20,000 feet and 36,089 feet). The graphs show that with increasing Mach number, the engine corrected airflow of the conventional SLS engine necessarily drops once the turbine inlet temperature and actual compressor speeds are at their maximum allowable values. On the other hand, the engine corrected airflow for the point design engine of the present invention remains substantially constant for all flight Mach numbers up to the point design flight Mach number of 2.0. It will be noted that the graphs for the point design engine show a slight increase in engine corrected airflow with increases in Mach number at all three altitudes. This slight increase is caused by the computer simulation technique employed to generate the curve shown in FIG. 5. Under actual operating conditions, however, the engine corrected airflow would be maintained at or near the predetermined constant value and would not vary nearly as much as shown in the graphs. The engine corrected airflow is maintained at a constant value in the point design engine at flight Mach numbers below 2.0 by reducing the turbine inlet temperature along with a decreasing compressor inlet temperature to prevent corrected rotor overspeed. The reduction in turbine inlet temperature is scheduled to hold the maximum engine corrected airflow at a constant compressor match point for all flight conditions.

Figure 6:
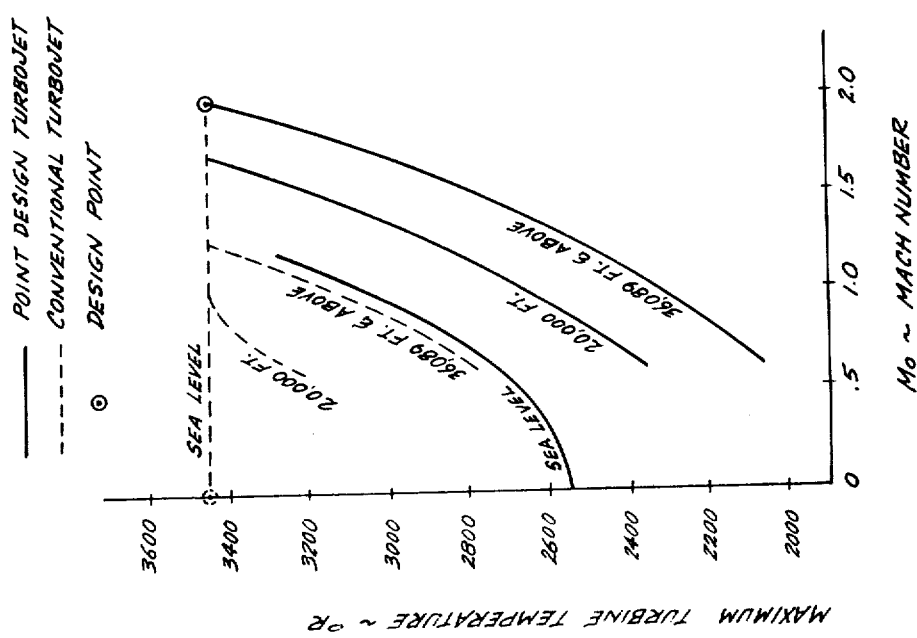
FIG. 6 is a graphic comparison of the maximum turbine temperature in degrees Rankine at selected flight altitudes of the point design turbojet engine of the present invention and a conventional SLS turbojet engine versus increasing flight Mach number.

The turbine inlet temperature schedule required to maintain the constant corrected airflow and to prevent corrected rotor overspeed for the point design engine of the present invention is illustrated in the graphs of FIG. 6. Referring to FIG. 6, the dot-dash line graphs of turbine inlet temperature correspond to the altitudes of sea level, 20,000 feet and 36,089 feet. Since the conventional turbojet is designed for maximum performance at an intermediate throttle setting at sea level static, it is designed for operation at its maximum turbine inlet temperature at sea level static conditions. Since the turbine inlet temperature cannot be allowed to exceed that maximum without damage to the engine, the turbine inlet temperature remains constant at the maximum as the flight Mach number increases, causing the engine corrected airflow to drop with increasing flight Mach number. The decrease in engine corrected airflow affects the engine performance, since the net thrust output of the engine falls off in proportion to the decrease in airflow. When the conventional turbojet engine is operating at 20,000 feet, the engine corrected airflow remains substantially constant until the turbine inlet temperature reaches its maximum allowable value at a flight Mach number of about about 1.0. With increasing flight Mach numbers, the turbine inlet temperature thereafter remains constant and is accompanied by a decrease in engine corrected airflow as shown in FIG. 5. Likewise, when the conventional turbojet engine is operating at 36,089 feet and above, the turbine inlet temperature is below the maximum allowable value at flight Mach numbers below about 1.2, but reaches the maximum at a flight Mach number of 1.2. At flight Mach numbers above 1.2, engine corrected airflow again begins to decrease with increasing flight Mach numbers as shown in FIG. 5.

In contrast, the turbojet engine of the present invention is point designed to operate at a maximum thrust at an intermediate throttle setting at a flight Mach number of 2.0. Thus, the turbine inlet temperature of the point design turbojet engine operating at sea level static conditions is well below that of its maximum allowable value. As the flight Mach number is increased at sea level, the turbine inlet temperature rises as shown in the solid line sea level graph of FIG. 6. Similarly, as the point design turbojet engine of the present invention is operated at higher altitudes, the turbine inlet temperature rises with increasing Mach number. However, the turbine inlet temperature does not reach its maximum value when being operated at 36,089 feet and above until the flight Mach number reaches 2.0, the cruise speed design point of the engine.

Figure 7:
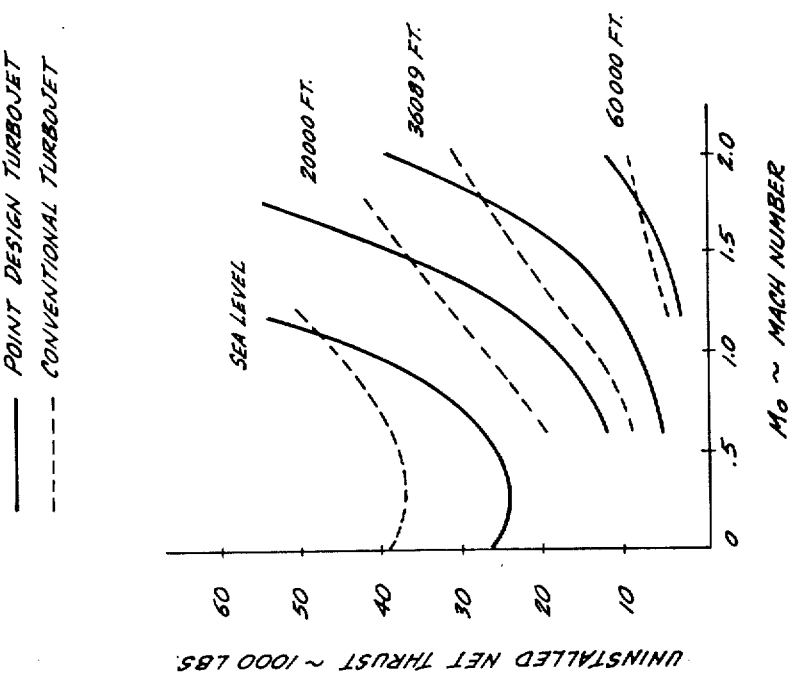
FIG. 7 is a graphic comparison of the uninstalled net thrust in thousands of pounds at selected flight altitudes for the point design turbojet engine of the present invention and a conventional SLS turbojet engine versus increasing flight Mach number.

Referring to FIG. 7, the uninstalled intermediate thrust (nonafterburning) versus flight Mach number for the conventional turbojet engine and the point design engine of the present invention is graphically illustrated for various altitudes. At all altitudes, the uninstalled net thrust of the point design engine of the present invention is lower than that of the conventional turbojet engine through the initial portion of the flight regime. However, at the upper end of the flight regime, that is, at the top speeds for a given altitude, the uninstalled net thrust of the point design engine exceeds that of the conventional turbojet engine. The intermediate thrust of the point design engine is greater than that of the conventional engine at the upper end of the flight regime for a given altitude because of the higher corrected airfow capability of the point design engine, as discussed in conjunction with FIG. 5. At lower flight Mach numbers, the net thrust of the point design engine of the present invention falls below that of the conventional turbojet engine as the turbine inlet temperature of the point design engine is reduced. As discussed in conjunction with FIG. 6, the reduction in turbine inlet temperature causes the lapse in intermediate thrust with decreasing flight Mach numbers for the point design engine relative to the conventional engine.

Figure 8:
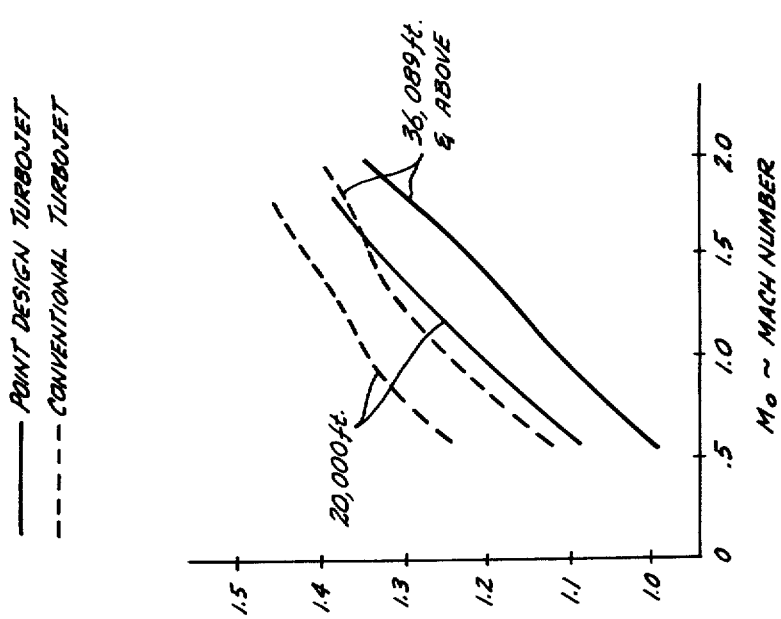
FIG. 8 is a graphic comparison of the uninstalled specific fuel consumption in pounds of thrust per pound of fuel consumed per hour at selected flight altitudes for the point design turbojet engine of the present invention and a conventional SLS turbojet engine versus increasing flight Mach number.

The lapse in thrust at lower flight Mach numbers in the point design engine of the present invention is accompanied by a decrease in uninstalled specific fuel consumption. Referring to FIG. 8, the dashed lines graphically illustrate the specific fuel consumption of the conventional turbojet engine at altitudes of 20,000 feet and 36,089 feet and above, while the solid lines graphically illustrate the specific fuel consumption of the point design turbojet engine with increasing Mach number. At 20,000 feet, the spread between the point design engine and the conventional turbojet engine is on the order of 0.2 pounds per pound per hour (lb/lb-hr) indicating that, although there is a lapse in performance by the point design engine, there is an advantageous result in that the fuel consumption of the point design engine is not as high as the conventional engine. Likewise, at 36,089 feet and above, the difference in specific fuel consumption between the point design turbojet engine and the conventional turbojet engine is between 0.1 and 0.2 lb/lb-hr, again indicating lower fuel consumption by the point design engine. The improvement in the specific fuel consumption of the point design engine relative to the conventional engine, especially at higher Mach numbers, is due to the improved propulsion efficiency of the point design engine.

Figure 9:
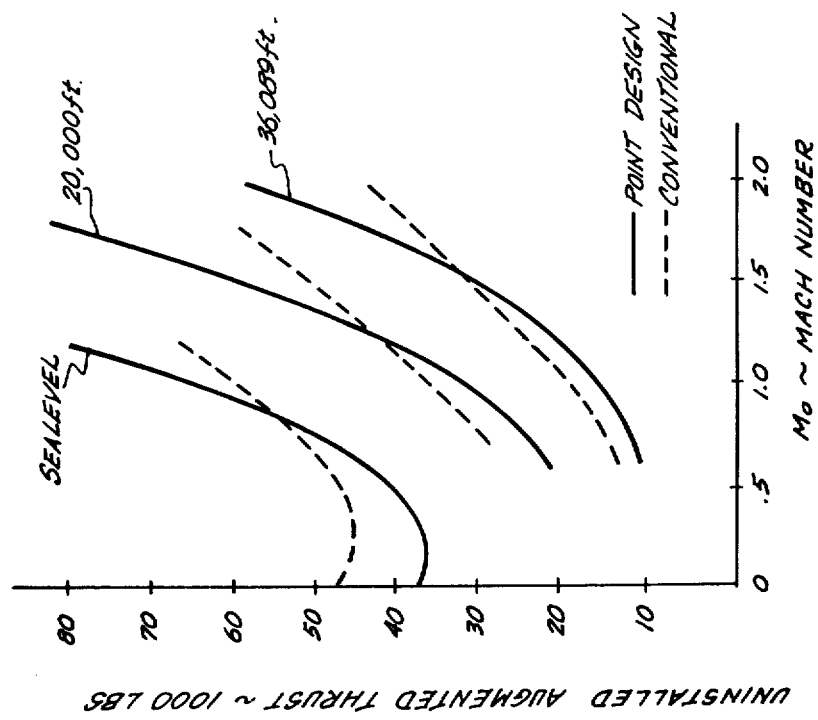
FIG. 9 is a graphic comparison of uninstalled augmented thrust in thousands of pounds at selected flight altitudes for the point design turbojet engine of the present invention and a conventional SLS turbojet engine versus increasing flight Mach number.

Since the intermediate thrust lapse of the point design engine of the present invention may be too severe for acceptable levels of airplane acceleration, especially through the transonic flight regime, it may be desirable to augment the intermediate performance of the engine by employing an afterburner, such as described in conjunction with FIG. 4. For purposes of comparing the augmented performance of the point design engine and a conventional SLS turbojet engine, the maximum augmented thrust for an afterburner in each of the engines that operates at a constant exit temperature of 3800° Rankine at all flight Mach numbers was estimated at several altitudes over a given flight speed range. As illustrated in FIG. 9, the uninstalled augmented thrust (in 1,000's of pounds) for the point design engine and the conventional engine is separately plotted versus increasing Mach number for altitudes of sea level, 20,000 feet and 36,089 feet and above. The solid line graphs represent the augmented thrust of the point design engine while the dashed lines represent the augmented thrust of the conventional turbojet engine. At high Mach numbers, the point design engine has greater augmented thrust, due to the increased airflow handling capabilities. However, at lower flight Mach numbers, the augmented thrust of the conventional engine is superior to that of the point design engine. Although not shown by graphic illustration, it must be realized that the uninstalled specific fuel consumption at an augmented thrust setting is significantly higher for the point design turbojet engine when compared to the conventional turbojet. However, at the highest Mach numbers, the specific fuel consumption of both engines operating at an augmented throttle setting converge to provide almost identical specific fuel consumptions.

The installed performance of the point design engine has also been estimated and compared with the conventional engine. The installed thrust at intermediate throttle settings and at augmented throttle settings is very similar to that calculated for uninstalled performance as graphically illustrated in FIG. 9. Furthermore, the installed specific fuel consumptions are very similar to the uninstalled specific fuel consumptions when a fixed geometry inlet configuration is employed.

From the foregoing data, it can be readily ascertained that the point design tubojet engine offers large increases in intermediate thrust over the conventional turbojet engine at flight Mach numbers on the order of 2.0. The high intermediate thrust levels provide the capability to achieve and sustain supersonic cruise speeds at intermediate thrust levels rather than relying on continuous augmented thrust levels as required with conventional turbojet engines. The tradeoff that must be accepted with the point design engine is the intermediate thrust lap in the transonic regime relative to the conventional engine. As discussed, however, the intermediate thrust lapse can be largely overcome by augmenting the thrust to achieve a high acceleration rate through the transonic flight regime. The augmented thrust for the point design engine of the present invention offers comparable thrust levels for transonic acceleration to that of the conventional engine while still retaining a high level of intermediate thrust at supersonic cruise. Thus the overall benefits of the point design engine outweigh the disadvantages of the conventional turbojet engine for extended supersonic cruise conditions, primarily because the specific fuel consumption is lower at cruise speeds. Perhaps the most important advantage to the point design engine of the present invention is that acceptable thrust levels can be achieved in all flight regimes from sea level to 60,000 feet or more and from flight Mach numbers up to on the order of 2.0 with fixed inlet geometry.

Referring now to FIG. 10, a second engine point desinged for maximum efficiency at intermediate thrust settings at a flight Mach number of 2.7 is illustrated. The engine, similar im most respects to that previously described, is a single spool turbojet having single compressor stage and one turbine stage having variable angle rotor blades. The engine is designed, for example, to have a compressor pressure ratio on the order of 8 and a turbine inlet temperature on the order of 2,800° F. The engine employs an afterburner with a variable geometry exhaust nozzle. To achieve maximum thrust for acceleration, it is preferred that the engine be operated with augmented thrust at takeoff to minimize the field length required for takeoff and that the engine be operated with augmented thrust at transonic speeds to achieve maximum transonic acceleration. However, once the flight Mach number approaches the cruise speed design point of 2.7, the augmented thrust can be eliminated and only intermediate thrust employed to achieve and maintain a cruise speed of Mach 2.7. Still referring to FIG. 10, the Mach 2.7 engine 130 is illustrated in conjunction with a fuel flow control system for maintaining the maximum corrected airflow through the engine constant at flight Mach numbers below 2.7. The engine 130 includes a housing 132, inlet face 134 and a variable geometry nozzle 136. The engine has a single spool including a drive shaft 138 mounted for rotation on bearings 140 that directly couple the five compressor rotors 142, 144, 146, 148 and 150 with the single turbine rotor 152. Each of the compressor rotors carries a set of compressor blades 142a through 150a. Stator blades 154, 156, 157, 158 and 160 are associated with each of the rotors in a conventional manner. An annular combustor, generally designated 162, is located in the engine aft of the compressor. The combustor 162 houses the nozzles for spraying fuel into the combustor section. A single spray bar 164 is shown in FIG. 10 for injecting fuel into the combustor 162. The turbine rotor 152 is situated aft of the combustor 162 and includes variable angle rotor blades 152a, which will be described in greater detail in conjunction with FIG. 11. Stationary turbine guide vanes 163 are situated forwardly of the rotor blades 152a. The combusted gases from the combustor 162 pass through the guide vanes 163 and rotate the turbine rotor 152 by reaction with the turbine blades 152a. After the combusted gases are expanded through the turbine, they pass into the afterburning section 166 of the engine. Fuel is supplied to the afterburning section via an afterburner spray bar 167 (only one of which is shown in the drawings) supplied with fuel via line 170 from a fuel source (not shown). The fuel supply through line 170 is regulated in a conventional manner by conventional valving apparatus responsive to pilot controlled throttles. When the afterburner is employed with the engine 130, it is preferred to also employ a variable geometry nozzle 136 that is normally oriented in a first position shown in dot-dash outline 136a for intermediate throttle settings to restrict the nozzle throat. When the afterburner is in operation, the throat area of the nozzle is increased by moving the variable nozzle structure radially outwardly to the position shown in solid outline. The purpose of the variable geometry nozzle is the same as that for the previously described engine, namely, to relieve back pressure on the turbine and thus to match the flow and pressure of the nozzle to the corresponding speed and temperature of the turbine at intermediate throttle settings and augmented throttle settings. The control and actuation of the variable geometry nozzle 136 are not shown, as any of a variety of conventional variable geometry nozzles and actuating mechanisms can be employed with the engine 130.

The total inlet temperature at the face of the engine and, similarly, the engine corrected airflow, are maintained at a constant value for intermediate throttle settings for all flight Mach numbers below the point design Mach number of 2.7 by varying the fuel input to the engine to decrease the physical rotor speed as the flight Mach numbers decrease from the point design Mach number. In this embodiment of the invention, as illustrated in FIG. 10, the engine operating parameter that is correlated to and representative of the engine corrected airflow is the compressor pressure ratio. The compressor pressure ratio can be sensed by positioning a first pressure sensor 168 at the compressor inlet and a second pressure sensor 169 at the compressor outlet. Pressure signals provided by the pressure sensor 168 and 169 are transmitted via lines 172 and 174 to a comparator and signal conditioner 176. The comparator 176 compares the turbine inlet and outlet pressure signals provided through lines 172 and 174 and yields a differential signal that is indicative of the pressure ratio across the compressor of the engine. The differential signal is internally conditioned in the conparator/signal conditioner 176 to yield an output signal representative of the actual engine corrected airflow.

The output signal indicative of engine corrected airflow is transmitted via line 178 to the second comparator 180 where it is then compared with a reference signal input that corresponds to the maximum point design engine corrected airflow. The second comparator 180 provides an output control signal representing the difference between the actual and reference engine corrected airflow signals. The output signal from the second comparator 180 is transmitted via line 186 to control apparatus for adjusting the turbine inlet temperature to equilibrate the actual engine corrected airflow with the desired or reference engine corrected airflow in a manner similar to that of the engine described in conjunction with FIG. 4. For example, the output signal transmitted via line 186 can be employed to energize a servocontrol 188, which in turn actuates a fuel flow override control valve 190 to appropriately adjust the fuel flow into the combustor 162 of the engine 130 and thus appropriately adjust the turbine inlet temperature. Fuel is conventionally supplied to the engine 130 from a source (not shown) through the fuel line 192. The fuel flow rate is initially controlled by a manually operated fuel flow control valve 194 before entering the override flow control valve 190. The manually operated fuel flow control valve 194 is actuated by manually controlled throttles in a manner similar to that described in conjunction with the engine of FIG. 4. Thus at a manually set full intermediate thrust setting, the fuel flow control valve 194 is opened to its maximum extent. Fuel from the manual fuel flow control valve 194 is then variably restricted, dependent upon the compressor pressure ratio, by the override flow control valve 190 to meter the amount of fuel entering the combuster through the spray bar 164 and thereby maintain the desired engine corrected airflow through the engine at all flight speeds.

Referring to FIG. 11, in order to provide an engine that is point designed to provide maximum intermediate thrust at a cruise Mach number of 2.7 and that will provide adequate thrust at intermediate throttle settings in the transonic flight regime, it is preferable to employ variable turbine geometry. As illustrated in FIG. 11, the turbine guide vanes 163 are located ahead of the turbine rotor blades 152a. The rotor blades 152a are fixed, while the guide vanes 163 are mounted on radially oriented blade shafts 152b, in turn mounted for rotation on the engine housing forwardly of the turbine rotor 152, so that the angle of the guide vanes 163 can be varied relative to the angle of the rotor blades 152a. As schematically shown, the guide vane position can be varied between the position shown in solid outline where the angle of the rotor blades is small relative to the guide vanes and the position shown in dotted outline where the guide vanes are oriented at a greater angle relative to the rotor blades 152. The vane shafts 163a are coupled by a suitable actuating mechanism to a servocontrol 198. The vane angle is changed throughout the flight regime to achieve the desired turbine inlet temperatures and corrected airflow through the engine. At lower flight Mach numbers (at subsonic flight speeds), the vanes are positioned at the lesser angle (shown in dotted outline in FIG. 11). As the flight speed is increased, the vane angle is increased so that at supersonic flight speeds approaching the Mach 27 design point the vanes will be positioned at the greater angle (shown in solid outline). Although a variety of engine operating parameters and flight conditions can be sensed and used to control the blade position, the simplest parameter to measure and implement for control is the flight total temperature. The flight total temperature is sensed by a flight condition sensor 200. The flight condition sensor generates a signal that is indicative of the flight total temperature at a given flight Mach number. The signal is transmitted to a comparator 204 via a line 202. The comparator compares the sensed flight condition signal with a reference signal input to the comparator that is indicative of the desired vane angle, and generates a differential control signal that is transmitted via line 206 to selectively energize the servocontrol 198. The servocontrol motor actuates the vane shaft to change the vane angle to the desired position for the given flight condition sensed.

As will readily be ascertained by one of ordinary skill in the engine design technology, the point design engine of the present invention provides several advantages over the conventional turbojet engine designed for maximum efficient operation at sea level static conditions. The point design engine of the present invention meets the objects of the present invention in providing a relatively simple, easily controllable engine that is highly efficient for high altitude, intermediate thrust level cruise conditions. Accordingly, one of ordinary skill in the art, after reading the foregoing specification, will be able to effect various changes, substitutions of equivalents, and other alterations without departing from the concepts disclosed herein. Accordingly, it is intended that the grant of Letters Patent hereon be limited only by the definition contained in the appended claims and equivalents thereof.

The embodiments of the invention in which an exclusive property or privilege is claimed are defined as follows:

1. In a turbine engine designed to provide a predetermined amount of thrust at a given throttle setting when propelling an airplane at a predetermined supersonic Mach number, the improvement comprising:

control means for maintaining the corrected airflow in said engine substantially at a constant value at flight Mach numbers below said predetermined supersonic Mach number.

2. The engine of claim 1 wherein said turbine engine includes a compressor, a turbine, and a single drive shaft interconnecting said turbine and said compressor.

3. The engine of claim 2 wherein said turbine engine has a fixed geometry inlet for ducting air to said compressor.

4. The engine of claim 3 wherein said predetermined supersonic Mach number is in the range of from about 2.0 to about 2.7.

5. The engine of claim 4 wherein said turbine engine includes an afterburner and a variable geometry exhaust nozzle for directing exhaust gas away from said engine.

6. The engine of claim 4 wherein said turbine includes fixed turbine blades and stator vanes, said improvement further comprising means for mounting said vanes for rotation about an axis oriented substantially radially relative to said drive shaft, said vanes being so constructed and mounted as to be movable between a first position wherein said vanes are oriented at a first angle relative to said turbine blades and at least a second position wherein said vanes are oriented at a second angle relative to said turbine blades that is greater than said first angle, and wherein said improvement further comprises:

means for rotating said blades from said first position to said second position when a predetermined flight condition of said aircraft exceeds a predetermined value.

7. The engine of claim 6 wherein said predetermined flight condition comprises the flight total temperature, said means moving said vanes from said first toward said second position as the flight Mach number of said airplane increases.

8. The engine of claim 7 wherein said turbine engine includes an after burner and a variable geometry exhaust nozzle for directing exhaust gas away from said engine.

9. The engine of claim 8 wherein said predetermined supersonic Mach number is about 2.7.

10. The engine of claim 9 wherein said control means comprises:

means for sensing an engine operating parameter to provide a first signal representative of the corrected airflow in said turbine engine, means for comparing said first signal with a second signal representative of a predetermined maximum value of said operative parameter, means for providing a control signal representative of the difference between said first and second signals, and means for adjusting the engine operating condition in response to said control signal.

11. The engine of claim 10 wherein said engine operating parameter is the compressor pressure ratio.

12. The engine of claim 11 wherein said means for adjusting comprises means for controlling fuel flow to said engine.

13. The engine of claim 3 wherein said turbine engine has fixed turbine and stator blades and wherein said predetermined supersonic Mach number is about 2.0.

14. The engine of claim 13 wherein said control means comprises:

means for sensing an engine operating parameter to provide a first signal representative of the corrected airflow in said turbine engine, means for comparing said first signal with a second signal representative of a predetermined maximum value of said operating parameter, means for providing a control signal representative of the difference between said first and second signals, and means for adjusting the engine operating condition in response to said control signal.

15. The engine of claim 15 wherein said engine operating parameter is the turbine pressure ratio.

16. The engine of claim 15 wherein said means for adjusting comprises means for controlling fuel flow to said engine.

17. A method for controlling a turbine engine point designed to provide a predetermined amount of thrust at a given throttle setting when propelling an aircraft at a predetermined supersonic Mach number, comprising the steps of:

controlling the corrected airflow in said engine and maintaining the corrected airflow constant at flight Mach numbers below said predetermined supersonic Mach number.

18. The method of claim 17 wherein said turbine engine includes a compressor, a turbine, and a single drive shaft interconnecting said turbine and said compressor, and wherein the corrected airflow in said engine is maintained constant by reducing the rotational speed of said drive shaft as the flight Mach number is lowered below said predetermined supersonic Mach number.

19. A method for controlling a turbine engine point designed to provide a predetermined amount of thrust at a given throttle setting when propelling an airplane at a predetermined supersonic Mach number of about 2.0, said turbine engine including a compressor, a turbine, and a single drive shaft interconnecting said turbine and said compressor, said turbine having fixed turbine blades, comprisng the steps of:

sensing an engine operating parameter to provide a first signal representative of the corrected airflow in said turbine engine, comparing said first signal with a second signal representative of a predetermined maximum value of said engine operating parameter, providing a control signal representative of the difference between said first and second signals, and adjusting the engine operating condition of said engine in response to said control signal to maintain the corrected airflow through said engine constant at flight Mach numbers below 2.0.

20. The method of claim 19 wherein said engine operating parameter is a pressure ratio across a predetermined portion of said engine.

21. In a method for controlling a turbine engine point designed to provide a predetermined amount of thrust at a given throttle setting when propelling an airplane at a predetermined supersonic Mach number of about 2.7, said turbine engine including a compressor, a turbine, and a single drive shaft interconnecting said turbine and said compressor, said turbine having fixed turbine blades, including the steps of:

sensing an engine operating parameter to provide a first signal representative of the corrected airflow in said turbine engine, comparing said first signal with a second signal representative of a predetermined maximum value of said engine operating parameter, providing a control signal representative of the difference between said first and second signals, adjusting the engine operating condition of said engine in response to said control signal to maintain said engine operating parameter constant at flight Mach numbers below 2.7, an improvement comprising the steps of:

sensing the flight total temperature, and decreasing the angle of the turbine stator vanes relative to the turbine blade at flight Mach numbers below a predetermined flight Mach number less than 2.7.

22. The method of claim 21 wherein said engine operating parameter is a pressure ratio across a predetermined portion of said engine.

23. An airplane having a wing, a vertical stabilizer, a canard, and a turbine engine mounted in the fuselage of said airplane, said engine being point designed to provide maximum thrust at a given throttle setting when said airplane is being propelled by said engine at a predetermined supersonic flight Mach number, said engine including control means for maintaining the corrected airflow through said engine at a substantially constant value at flight Mach numbers below said predetermined supersonic flight Mach number, said airplane including an inlet positioned adjacent the rearward portion of said canard for ducting air to said turbine engine, and a nozzle located in the aft portion of said fuselage for directing exhaust gases from said engine rearwardly from said engine and said fuselage.

24. The airplane of claim 23 wherein said canard is located on said fuselage above and forwardly from said inlet and is positioned relative to said inlet so as to provide precompression of the air flowing under said canard and into said inlet while said airplane is in flight.

25. The airplane of claim 24 wherein said predetermined supersonic flight Mach numbers is in the range of from about 2.0 to about 2.7.

26. The airplane of claim 25 wherein said inlet has fixed geometry and wherein said exhaust nozzle has variable geometry, said predetermined supersonic flight number being about 2.7.

* * * * *